April 24, 1934.　　　C. T. LITTLE　　　1,956,038
MECHANISM AND CIRCUITS FOR SELECTIVE OPERATION OF ELECTRICAL SWITCHES
Filed April 20, 1931　　2 Sheets-Sheet 1

Clifton T. Little
INVENTOR

BY
Watson, Bristol, Johnson & Leavenworth
ATTORNEY

April 24, 1934.　　　　　C. T. LITTLE　　　　　1,956,038
MECHANISM AND CIRCUITS FOR SELECTIVE OPERATION OF ELECTRICAL SWITCHES
Filed April 20, 1931　　　2 Sheets-Sheet 2
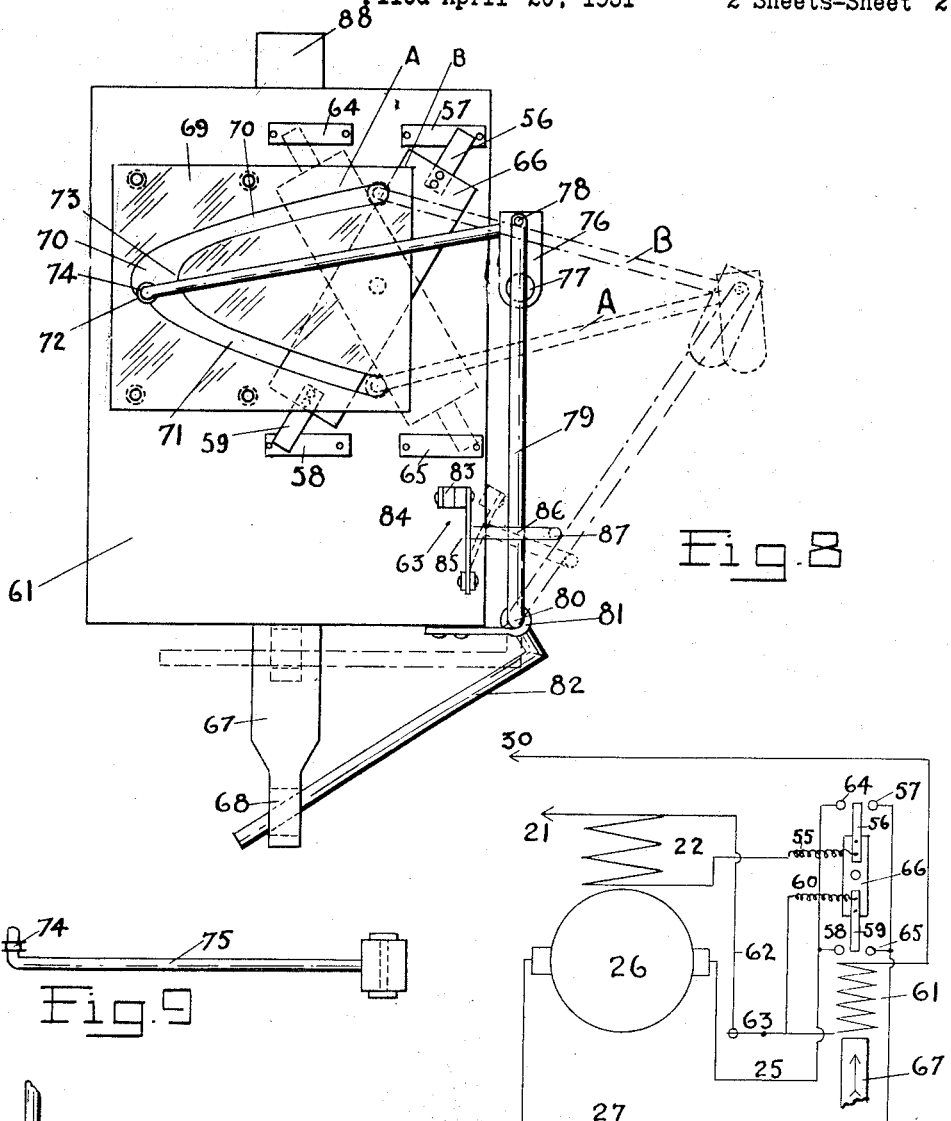
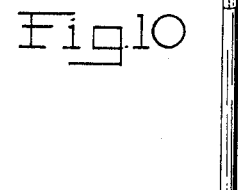
Clifton T. Little
INVENTOR
BY
Watson, Bristol, Johnson & Leavenworth
ATTORNEY Patented Apr. 24, 1934

1,956,038

UNITED STATES PATENT OFFICE 1,956,038

MECHANISM AND CIRCUITS FOR SELECTIVE OPERATION OF ELECTRICAL SWITCHES

Clifton Talmadge Little, Flushing, N. Y.

Application April 20, 1931, Serial No. 531,388

10 Claims. (Cl. 200—111)

The invention relates to mechanisms for the selective operation of switches in electrical circuits; and more particularly to mechanisms whereby the current through branch circuits and electrical devices in the circuits, such as, for example, the windings of electric motors, may be selectively controlled by manipulation of a remote control device.

A general object of the invention is the provision of mechanisms which will attain selective control of the flow of current through branch circuits and electrical devices, such as, for example, the windings of electric motors, by simple manipulation of a control device in the circuit.

A more specific object of the invention is the provision of a switch mechanism operated by an inertia member which is controlled in operation by a control rheostat, whereby a plurality of electrical switch contacts may be selectively operated upon proper manipulation of the control rheostat.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawings, in which:

Fig. 7 is a diagrammatic representation of a circuit arrangement in which is used a modified form of the switch mechanism of the present invention.

Fig. 8 is an elevational side view of the switch mechanism diagrammatically depicted in Fig. 7.

Fig. 9 is a top view of the inertia arm used in the switch mechanism of Fig. 8.

Fig. 10 is a view, looking in the direction of the arrow shown in Fig. 8, of the operating arm upon which the inertia arm is mounted, with parts broken away.

In the reversal of operation of electric motors it has been common practice to manually operate reversing switches to attain a reversal of the current through the armature or the field of an electric motor. It is common knowledge that in an electric motor a reversal of current through the armature or the field of the electric motor will attain a reversal of operation of the motor. In utilizing this principle in the operation of electric trains, manual control on the train for operating a reversal switch has been necessary. In toy train operation, it has been the commercial practice to mount on the motor of the train a reversing switch to be manually operated when a change in the direction of travel of the train is desired. This necessitates stopping the train so that the switch may be manually operated.

Some devices have been suggested for operating reversing switches on the train during the manipulation of the starting rheostat in the circuit. However, these devices, for the most part, have been extremely complicated in structure and attain the desired result through a minimum of efficiency in operation and usually with a loss of power.

In accordance with the present invention, novel reversing switch mechanisms are provided which are simple and efficient in operation, cheaply constructed and can be used to attain a reversal of operation of an electric motor by simple manipulation of a control rheostat without an appreciable loss of power.

Figure 1:
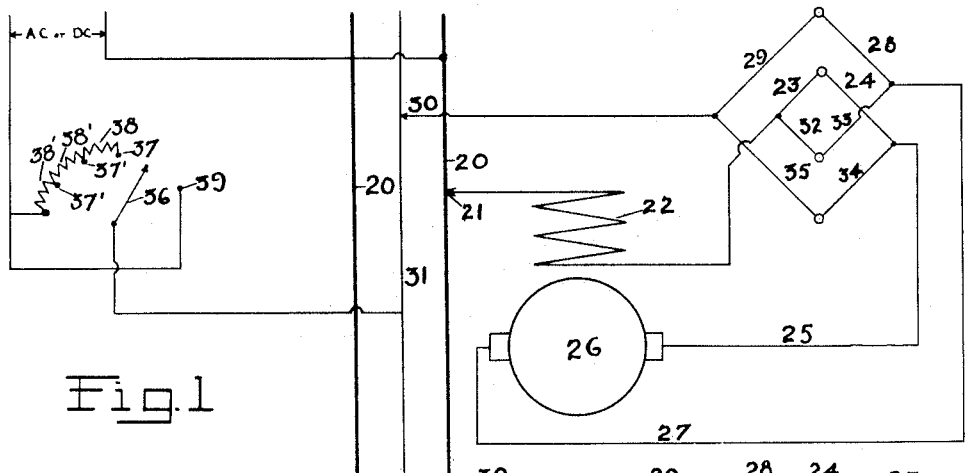
Fig. 1 is a diagrammatic representation of a novel circuit arrangement in which the novel switch mechanism of the present invention can be used, diagrammatically depicting the circuit of the switch mechanism.

In the drawings like numerals refer to similar parts. In Fig. 1, a diagrammatic view of a circuit arrangement for the novel reversing switch mechanism and an electric motor are shown in connection with the supply circuit including a control rheostat and the track of a toy train. One side of the supply circuit is connected to the rails 20, 20. A pick-up is indicated at 21 to make contact with the rail to supply current to the motor circuit. This pick-up is connected in series with the winding of a motor field 22 which in turn is connected through branches 23 and 24 of a closed loop, indicated in the diagram, to the conductor 25 connected to one commutator of the armature 26 of the motor. The other commutator of the motor is connected to the conductor 27 which in turn makes electrical connection with the pick-up 30 through the branches 28 and 29 of the closed loop. Pick-up 30 makes contact with the third rail 31 to which the other side of the supply circuit is connected, in which a control rheostat is connected. The left-hand side of the control rheostat comprises switch points 37, 37', 37', 37' and resistances 38, 38', 38' interposed between these contacts. A contact 39 is shown to the right of the aforementioned resistance contacts giving a contact point for closing the circuit without any included resistance. When the rheostat arm 36 is thrown to the left, the resistances are connected in series in the circuit which obviously allows less current to flow in the circuit than when the rheostat arm 36 is thrown to the right in contact with contact 39.

It will be noted that a closed loop is provided in the motor circuit comprising branches 23, 24, 34, 35, 29, 28, 33, and 32, following around the circuit to the right. To this circuit are connected, as indicated at four separate points between the various branches, the two conductors 25 and 27 of the motor armature 26 and the two pick-ups 21 and 30 with the motor field connected in series with pick-up 21. It will be noted that when contact is broken between the branches 32 and 33 and 35 and 34 respectively, a closed loop is obtained through the windings of motor field and armature from the track through the branches 23 and 24, and 29 and 28. When contact between 32 and 33, and 35 and 34 is made and contact between the branches 23 and 24, and 29 and 28 is broken, a complete circuit from the pick-ups 21 and 30 through the windings of the motor elements, that is the motor field and motor armature, is also attained but the connection of the winding of one of the motor elements in the circuit with respect to the other is reversed. Thus, by proper making and breaking of the contacts in the closed loop, the direction of rotation of the motor armature may be selectively controlled.

Figure 3:
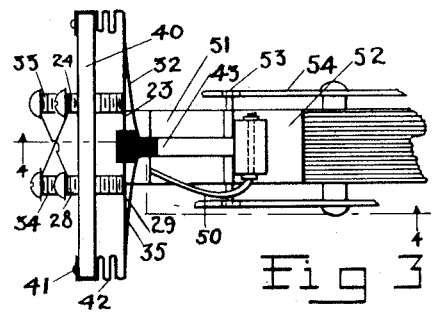
Fig. 3 is a top plan view of one modification of the switch mechanism diagrammatically shown in Figs. 1 and 2.
Figure 2:
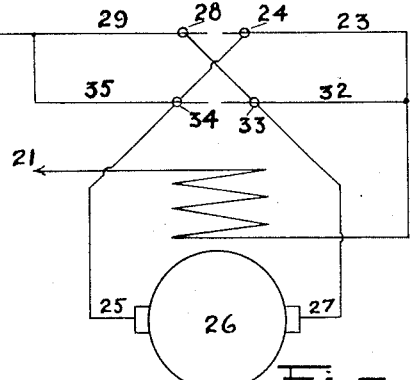
Fig. 2 is a diagrammatic view of a portion of the circuit of Fig. 1, more clearly depicting the relative positions of the switch mechanisms utilized therein.
Figure 4:
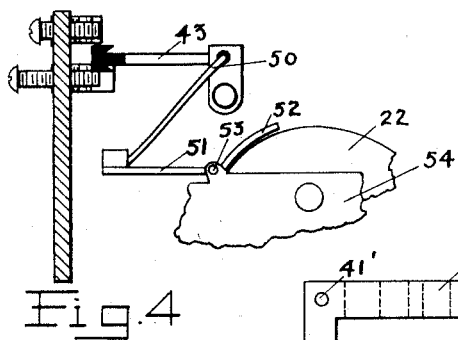
Fig. 4 is an elevational view of the switch mechanism depicted in Fig. 3, with parts in section taken on line 4—4 of Fig. 3.

In Fig. 3, a top view of the mechanism of the present invention for selectively operating the contacts in the closed loop is shown. This mechanism includes an upright switch panel 40 through which are mounted fixed contacts, such as, for example, screws, 24, 28, 33 and 34; fixed contacts 24 and 28 being mounted above the fixed contacts 33 and 34 respectively, as is more clearly shown in Fig. 4. Upon this panel are mounted switch contact arms 23, 29, 32, and 35, each of which normally makes contact with the inner ends of the fixed contacts 24, 28, 33, and 34 respectively. It will thus be seen from Fig. 2, which is a diagrammatic view of the same motor circuit shown in Fig. 1 but indicating more clearly the actual position of the various elements of the closed loop of the switch mechanism, that the contacts of the closed loop remain normally closed connecting the winding of the motor field in the circuit alone. As was indicated above, the winding of the motor armature is connected into the circuit by breaking two pair of contacts of the closed loop. This operation is selectively performed by an inertia arm 43, pivoted to the operating arm 50, mounted on the metallic plate 51, pivoted to the motor frame 54 at 53 as is clearly shown in Fig. 4. The metallic plate 51 is formed from, or includes, iron and has a portion 52 shaped to conform to the shape of the core of the motor field 22, and lying closely adjacent thereto.

When the rheostat is open, the current flows through the winding of the field alone, as mentioned above, and a magnetic pull is thus exerted on the portion 52 of the plate 51 lying adjacent the core of the field 22. This operation pulls the inertia arm 43 away from the switch panel 40 and causes the insulated head thereof to engage a pair of the movable contacts 23, 29, 32 and 35, thus connecting the winding of the armature of the motor in the circuit allowing the motor to operate in one direction.

Figure 5:
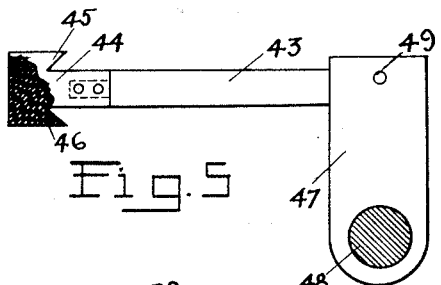
Fig. 5 is an enlarged view of the inertia arm which operates the switch mechanism depicted in Figs. 3 and 4.

In Fig. 5, a detailed view of the inertia arm 43 is shown. To one end of this inertia arm is mounted the insulated head 44 having an upper switch contact arm engaging portion 45 and a lower switch contact arm engaging portion 46. To the other end of this arm is rigidly connected the member 47 disposed substantially at a right angle to the arm 43. This arm 47 preferably carries a weight 48 at its lower end and is provided with a hole 49 adjacent the point of fixation to the arm 43 to provide for a pivotal mount thereof to the operating arm 50.

Figure 6:
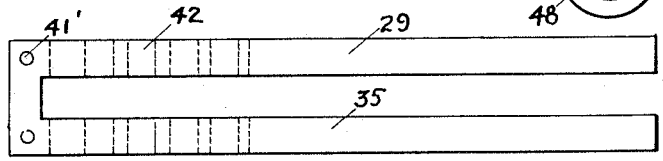
Fig. 6 is an enlarged plan view of a blank to be formed up for switch contact arms utilized in the switch mechanism.

A detailed view of the blanks from which contact arms 29 and 35 are formed is shown in Fig. 6. These switch contact arms preferably comprise the arms of a U-shaped blank provided at 41' with means for fixation to the panel 40. At 42 these arms are reversely bent to form adjacent portions overlying each other, as is indicated in Fig. 3, to provide the required resiliency of the switch contact arms.

In operation when the rheostat arm 36 is thrown to the left the supply circuit is closed and the resistance of the rheostat is connected therein. A relatively low magnetic field is thus built up around the motor field 22 by virtue of the fact that less current flows in the circuit than does when the circuit is closed with the inclusion of substantially no rheostat resistance. This magnetic field causes the portion 52 of the plate 51 to be pulled over adjacent the core of the motor field 22 relatively slowly, allowing the portion 46 of the insulated head 44 of the arm 43 to engage the lower pair of switch contact arms 32 and 35, and to disengage them from the fixed contacts 33 and 34, respectively. This operation connects the winding of the motor armature 26 in the circuit attaining operation of the motor in one direction. The rheostat arm 36 can then be rotated to an extreme left position to cut out the rheostat resistance, attaining connection of the motor directly in the circuit. The motor remains in operation so long as the motor field is electrically energized, by virtue of the fact that the portion 52 of the plate 51 remains in an operative position due to the magnetic pull of the energized motor field.

To reverse the direction of operation of the motor, the rheostat arm 36 is rotated to the right until the circuit is broken. This allows the switch contact arms in the closed loop to contact with the fixed contacts cutting the winding of the armature out of the circuit. Upon swinging the rheostat arm to the extreme right position to contact with the contact 39, the winding of the motor field 22 is energized by a full value of the current in the supply circuit. This causes the motor field to be energized and builds up around that field a magnetic field of relatively greater value than when the rheostat resistance is connected in the circuit. This causes the portion 52 of the plate 51 to be pulled over adjacent the core of the motor field more quickly than in the case where the rheostat resistance was connected in the circuit, thus carrying the inertia arm 43 away from the panel at an accelerated speed, and due to the fundamental principle of inertia of a weight, the head end of the inertia arm 43 is pivoted upwardly such that the portion 45 engages the upper pair of switch contact arms 23, 29 causing them to be disengaged from the fixed contacts 24 and 28, respectively. This operation connects the winding of the motor armature in the circuit in a reversed direction with respect to the winding of the motor field, thereby attaining a reversal of operation of the motor.

In Fig. 8, a modified form of switch mechanism is depicted. In Fig. 7, a diagrammatic representation is shown of a circuit in which may be used this modified form of switch mechanism. The rail pick-up 21 is connected to one end of the winding of the motor field 22, the other end of the latter being connected to a spring member 55 which in turn is connected to a strap contact 56 adapted to contact with the contact point 57 to make electrical connection with a commutator bar of the motor armature through the conductor 27. The third rail pick-up 30 is connected in series with the winding of a solenoid 61 which, in turn, is connected to a strap contact 59 through the spring member 60. This strap contact 59 is adapted to engage the contact point 58, electrically connected to the other commutator bar of the armature through the conductor 25. Strap contacts 56 and 59 are mounted upon a pivoted switch base 66 of insulating material. When this member is pivoted to the right, the connection through the windings of the motor field and motor armature just described is attained. When pivoted to the left the contact straps 56 and 59 make contact with the contact points 64 and 65 respectively, thus reversing the connection of winding the armature in the circuit with respect to the winding of the field. The conductor 62 is shown, which, when the switch 63 is closed, connects the winding of the solenoid 61 in the circuit alone.

As is shown in Fig. 8 the switch mechanism consists of a solenoid 61 provided with an iron core 67 slotted at its lower end at 68 for a purpose to be set forth later. Upon the casing of this solenoid is pivoted an insulating switch base 66 carrying strap contacts 56 and 59. The contact points 57, 64, 65 and 58 are shown mounted on the casing of the solenoid in their relative positions. Adjacent the pivoted switch base, and in overlying relationship thereto, is mounted the cam plate 69, provided with a U-shaped cam slot 70 consisting of upper and lower cam slot branch arms 70 and 71 respectively. This cam slot is so formed as to provide a rest position 72 for a cam rider below the projection 73. The cam rider 74 is mounted on one end of an inertia arm 75 as is clearly shown in Fig. 9. Upon the other end of this inertia arm is rigidly mounted the member 76 which preferably carries at its lower end a weight 77 and which is pivoted at 78 to an operating arm 79 pivotally mounted at 80 to the casing of the solenoid by means of a strap member 81. Thus the operating arm 79 includes an arm 82 adapted to underlie the solenoid 61 and to project into the slot 68 of the solenoid core 67. The shape of this member is clearly shown in Figs. 8 and 10. The switch 63, shown mounted on the casing of the solenoid, includes contacts 83 and 84. The contact 83 is rigidly mounted on the solenoid casing while the contact 84 is carried by a resilient arm 85 mounted on the solenoid casing. To the arm 85 is rigidly secured a member 86 provided at its end with a stop 87 adapted to be engaged by the operating arm 79.

In operation, the switch 63 being closed, the winding of the solenoid 61 is connected solely into the circuit upon operation of the rheostat arm 36 to either position. When the rheostat arm is operated to the left, introducing into the circuit the resistance of the rheostat, a magnetic field of relatively low value is built up around the solenoid which pulls the solenoid core 67 within the solenoid, pivoting the operating arm 79 to the right. The operating arm carries with it the inertia arm 75 causing the rider 74 to follow the lower branch arm 71 of the cam slot until the end of the inertia arm adjacent the rider engages the insulated switch base 66 whereupon the switch base is rotated to the left to the position "A" indicated in Fig. 8.

The operating arm 79 in its movement engages the stop 87 on the member 86, thus opening the switch 63 and connecting the winding of the motor field into the circuit when the strap contacts 56 and 59 engage the contact points 64 and 65 respectively, to connect the winding of the motor armature into the circuit. This attains operation of the motor in one direction.

When it is desired to reverse the operation of the motor, the rheostat arm 36 is moved to the right to the position shown in Fig. 1, whereupon the core 67 of the solenoid drops down due to its own weight, returning the inertia arm to the position shown in full lines in Fig. 8 and allowing the switch 63 to close. When the rheostat arm is rotated further to the right, such that it contacts with the contact 39, the solenoid, being connected in the circuit alone through the shunt conductor 62, quickly pulls the solenoid core 67 within the solenoid. This action is much more rapidly accomplished than in the case where the resistance of the rheostat is connected in the circuit since a higher value of current flows in the circuit thus building up a stronger magnetic field about the solenoid. The result is that the operating arm 79 is pivoted to the right much more rapidly causing the inertia arm 75 to swing upwardly about its pivotal mount 78 due to the inertia of the weighted member 76. This allows the cam rider 74 to pass upwardly above the projection 73 and follow the upper branch arm 70 of the cam slot. In the movement of the inertia arm 75 to the right, the end thereof adjacent the cam rider engages the switch base 66 causing it to rotate to the right, to the position indicated in full lines in Fig. 8, thus causing the strap contacts 56 and 59 to engage the contact points 57 and 58 respectively. Through this operation, the winding of the armature of the motor is reversely connected in the circuit with respect to the winding of the field, thus attaining operation of the motor in the reverse direction.

In Fig. 8 a small fixed core 88 is shown mounted in the upper end of the solenoid. This fixed core operates to maintain the movable solenoid core 67 within the solenoid after the motor is started, thus avoiding the possibility of accidental operation of the switch mechanism through jarring, vibration, or due to extremely short periods of power cut-off, any of which might allow the solenoid core 67 to drop. By the use of the term "rheostat" throughout the specification and claims, it is intended that any device or devices for attaining different values of current in the circuit shall be covered thereby. It is obvious that resistance can be used in both sides of the rheostat shown, when attaining the operation of the switch mechanisms, so long as the initial positions of the rheostat arm, when the circuit is closed, introduce into the circuit resistances of different values such that currents of different values are caused to flow in the circuit. Likewise it is obvious that two rheostats having different resistance values may be substituted for the one described. In any case, the operations of the switch mechanisms depend solely upon the differences in values of the initial currents in the circuit.

The term "inertia member" in the specification and claims is intended not only to refer to the specific inertia arms and the associated members which support and operate them depicted in the drawings but also to any members adapted to describe different paths of movement when operated at different speed accelerations by reason of the fact that the mass of a movable object has a characteristic known as "inertia".

It will thus be seen that in accordance with the present invention, switch mechanisms for selectively controlling the flow of currents in circuits and through electrical devices in such circuits, such as the windings of an electric motor, have been provided which attain the objects set forth above in an efficient and simple manner. The switch mechanisms are simple in structure and operation and may be used to attain efficient reversal of operation of the electric motor with a minimum number of operations. Due to their simplicity, these switch mechanisms can be cheaply produced. The operation of these switch mechanisms being based on a simple principle of mechanics is sure and efficient.

It is clear that the use of these devices is not limited in any sense to toy train operation or even to the control of operation of electric motors, generally. Such inertia members could obviously be used to selectively open and close electrical circuits, or to selectively connect into a master circuit branch circuits, including any type of electrical devices depending for operation on a flow of electrical current. It is likewise possible to mount the movable contacts of a supply circuit on such inertia members which would selectively close with the fixed contacts of branch circuits upon operation of the mechanism.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. In a reversing switch mechanism, the combination comprising a magnetically controlled member, an inertia arm pivotally mounted on said member in an initial stationary position, a plurality of fixed contacts and a movable contact, said inertia arm being adapted to operate said movable contact with respect to certain of said fixed contacts when said member is subjected to the influence of a strong magnetic field and to operate said movable contact with respect to other of said fixed contacts when said member is subjected to the influence of a weaker magnetic field, said movable contact being selectively operated by said inertia arm when the latter is operated in one of two different directional paths from the initial stationary position by said magnetically controlled member subjected to the influence of a magnetic field of proper strength to cause said inertia arm to follow the desired path.

2. In a reversing switch mechanism, the combination comprising a movable member mounted adjacent an electrical magnet, two movable contacts one above the other and an inertia arm pivoted on said member, the end of said arm being disposed between said contacts and adapted to engage the upper movable contact when said member is subjected to the influence of a strong magnetic field and to engage the lower movable contact when said member is subjected to the influence of a weaker magnetic field.

3. In a reversing switch mechanism, the combination comprising a plurality of movable contacts mounted in vertical planes, a movable member and an inertia member pivoted on said movable member, said inertia member including a substantially horizontal arm provided with movable contact engaging means at its end disposed between certain of said movable contacts and fixed at its other end to a vertical arm and pivoted to said movable member at its upper end.

4. In a reversing switch mechanism, the combination comprising a movable contact, a magnetically operated member and an inertia arm pivoted to said member and adapted when moved in one of two directions to operate selectively said movable contact, said inertia arm being adapted to move in one direction upon the operation of said member by a relatively strong magnetic field and to move in another direction upon the operation of said member by a weaker magnetic field.

5. In a reversing switch mechanism, the combination comprising a plurality of contacts mounted on a pivoted switch base, a plurality of fixed contacts, a magnetically operated member and an inertia arm pivoted to said member and adapted to selectively move said switch base to one of two positions to cause said movable contacts to engage certain of said fixed contacts.

6. In a reversing switch mechanism, the combination comprising a plurality of contacts mounted on a pivoted switch base, a plurality of fixed contacts, a magnetically operated member, an inertia arm pivoted to said member and a cam plate mounted adjacent said switch arm and provided with upper and lower cam slots, the end of said inertia arm being adapted to selectively ride in either of the cam slots and to engage said switch base and move the movable contacts to one position to engage certain of said fixed contacts when the end of said inertia arm rides in the upper cam slot and to another position to engage other of said fixed contacts when the end of said inertia arm rides in the lower cam slot.

7. In a reversing switch mechanism, the combination comprising a reversing switch, a magnetically operated member, a cam plate mounted adjacent said switch and provided with a U-shaped cam slot the branch arms of which are disposed substantially horizontal and an inertia arm pivoted to said member the end of said arm being adapted to ride in said cam slot and to operate said switch to one of two positions when the end of said arm is caused to ride in the upper branch arm of said cam slot by subjecting said member to the influence of a strong magnetic field and to the other of two positions when the end of said arm is caused to ride in the lower branch arm of said cam slot by subjecting said member to the influence of a weaker magnetic field.

8. In a reversing switch mechanism, the combination comprising a reversing switch, a solenoid, a pivotally mounted member connected to the core of said solenoid, a cam plate mounted adjacent said switch and provided with a U-shaped cam slot the branch arms of which are disposed substantially horizontal and an inertia arm pivoted to said member, the end of said arm being adapted to ride in said cam slot and to operate said switch to one of two positions when the end of said arm is caused to ride in the upper branch arm of said cam slot by causing the core of said solenoid to be pulled quickly within said solenoid and to the other position when the end of said arm is caused to ride in the lower branch arm of said cam slot by causing the core of said solenoid to be pulled more slowly within said solenoid.

9. In a reversing switch mechanism, the combination comprising a plurality of movable contacts, fixed contacts to cooperate respectively with said movable contacts, an electro-magnet, a member mounted to be operated rapidly by a strong magnetic field about said electro-magnet and to be operated more slowly by a weaker magnetic field, an inertia arm pivoted to said member to be moved into one predetermined position when said member is moved rapidly to selectively operate at least one of said movable contacts with respect to certain of said fixed contacts and to selectively operate other of said movable contacts with respect to the fixed contacts cooperating therewith when said member is moved more slowly.

10. In a reversing switch mechanism, the combination comprising an electro-magnet which is adapted to have a relatively strong magnetic field or a weaker magnetic field built up thereabout, a movable member of magnetic permeable material adjacent said electro-magnet to be moved relatively rapidly by a relatively strong magnetic field and to be moved more slowly by a weaker magnetic field, an inertia member pivoted to said movable member and comprising an arm extending away from said member, a movable contact operating portion on the free end of said arm and an inertia mass connected to said arm and hanging lower than the pivot point of said inertia member to cause said arm to extend in a desired direction and to move in one direction when said movable member is moved rapidly and to move in another direction when said movable member is moved more slowly so that a plurality of circuit contacts will be selectively operated by said contact operating portion.

CLIFTON TALMADGE LITTLE.